June 12, 1928.
W. A. MacKENZIE
1,673,463
BATTERY SEAL
Filed March 23, 1927
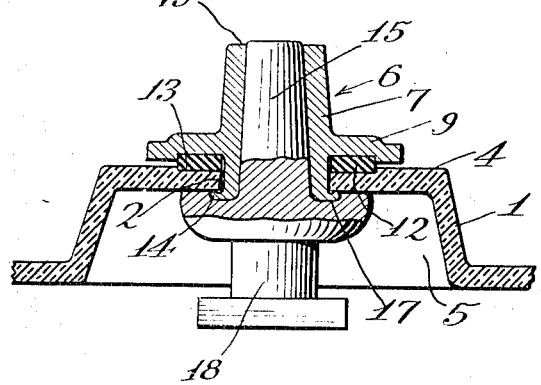
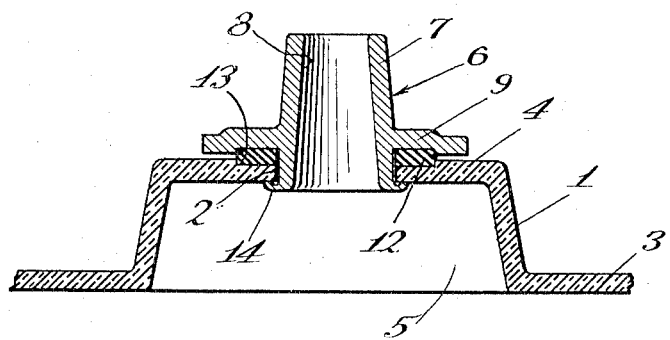
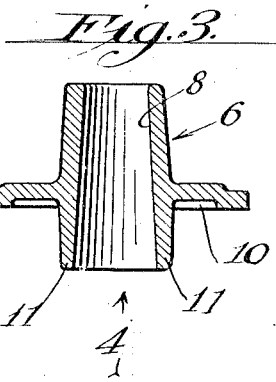
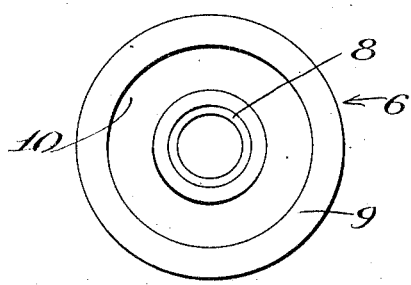
Inventor:
William A. MacKenzie.
by Hazard and Miller
Attorneys.

Patented June 12, 1928.

1,673,463

UNITED STATES PATENT OFFICE.

WILLIAM A. MacKENZIE, OF LOS ANGELES, CALIFORNIA, ASSIGNOR TO MATHEWS BROTHERS, A PARTNERSHIP COMPOSED OF A. A. MATHEWS AND H. M. MATHEWS, OF LOS ANGELES, CALIFORNIA.

BATTERY SEAL.

Application filed March 23, 1927. Serial No. 177,614.

My invention is a removable battery seal for a storage battery intended to give a substantially leak proof terminal.

In storage batteries it is very difficult to get a proper seal where the terminal passes through the top or cover of the battery, the acid of the battery seeping beween the metal part of the post and the covering material, whether this is composition or of other construction. Attempts have been made in the art to utilize a rubber gasket on the lower side of the cover, that is inside the battery surrounding the post or terminal, but this is unsatisfactory as the rubber is attacked by the acid and therefore the acid escapes.

An object of my invention is, therefore, the construction of a terminal which has a tight seal and utilizes a rubber gasket on the upper side of the cover, this gasket being squeezed tight to the cover and the terminal having an element beaded on the inside of the cover, thereby forming a tight joint with the cover.

In constructing my invention I utilize a tubular ring having a flange, the flange being horizontal when the ring is inserted vertically in the cover of a battery through an aperture in such cover. Immediately underneath the flange I secure a rubber gasket or the like between such flange and the battery cover and bead the lower end of the ring by rolling, spinning, or melting against the lower surface of the cover, thus making a tight seal so far as the ring is concerned. The metal post which connects to the battery plates fits inside the ring and at the top is welded or melted together with the ring forming a seal at the top. The post is provided with a collar which fits up against the bead on the ring, thus making substantially a tight joint at both the bottom and the top of the post with the ring.

My invention is illustrated in the accompanying drawings, in which:

Figure 1 is a vertical section through the terminal showing part of the post in elevation.

Figure 2 is a vertical section through the tubular ring as attached to the battery cover.

Figure 3 is a vertical section through the tubular ring disassembled.

Figure 4 is a bottom view of the ring taken in the direction of the arrow 4 of Fig. 3.

So far as it is necessary to illustrate, the battery cover is designated by the numeral 1 having the aperture 2 therein. This cover is shown as having a depressed part 3 and a raised part 4 with a hollow space 5 underneath, but it is to be understood that my terminal may be connected to any type of a battery cover.

The tubular ring 6 has a body portion 7 which is tapered on the inside surface 8. An annular flange 9 extends horizontally from the ring, such ring being presumed in a vertical position, and the flange has an annular recess 10. In assembling the ring and the battery cover the lower end 11 of the ring is inserted through the opening 2 of the cover, having first a gasket 12 fitted in the recess 10. The cover may have a corresponding recess 13 in which the gasket fits. The lower edge of the ring is then formed into a bead 14, which may be by rolling, spinning, or melting, and allowing flowing of the metal. This is easily accomplished as the ring is usually made of a lead composition.

The post 15 has a heavy annular collar 16 and an annular socket 17 which bears against the bead 14. The base part 18 of the post is connected to the battery plates in the usual manner. It will be noted that the upper part of the post is tapered conforming to the taper 8 of the ring and the upper edges 19 of the post and the ring are welded together by melting the metal and allowing it to flow, or by a species of soldering, or other equivalent procedure which unites the post and the ring, thereby forming a terminal to which the lead wires to the battery may be connected.

From the above construction it will be seen that the rubber or other gasket 12 is above the cover of the battery and hence would stop the leak of any of the battery acid which might seep between the opening 2 of the cover and the lower part of the ring. However, the bead 14, fitting tight against the lower part of the cover, will to a great extent prevent seepage of the acids. On account of the tight fit of the annular socket 17 of the collar 16 against the lower surface of the bead substantially no acid can seep through and if any acid should work between the post and the inner surface of the ring it cannot pass out of the battery on account of the upper end 19 of the ring and the post being welded or melted together.

It will thus be seen that I have provided a simple type of battery terminal seal and to remove the terminal it is only necessary to melt the top portion 19, separating the post from the ring, and take the cover off the battery. The bead 14 may then be pressed away from engagement with the inside surface of the cover and allow removal of the ring if desired.

Various changes may be made in the principles of my invention without departing from the spirit thereof, as set forth in the description, drawings and claims.

I claim:

1. In a battery terminal a battery cover having an opening, a ring having a tubular body portion with the lower end extending through said opening, an annular flange on the ring, an annular gasket fitting between the ring and the cover on top of such cover, and a bead formed on the lower end of the ring, said bead engaging the lower surface of the cover.

2. In a battery terminal a battery cover having an opening, a ring having a tubular body portion with the lower end extending through said opening, an annular flange on the ring, an annular gasket fitting between the ring and the cover on top of such cover, a bead formed on the lower end of the ring, said bead engaging the lower surface of the cover, a post fitted in the tubular ring, the lower part of said post being adapted to connect to battery plates, and a seal formed at the upper end of the post and the upper part of the ring.

3. A battery terminal comprising in combination a battery cover having an opening, a ring having a tubular body portion having its lower end fitting through said opening, the ring having an annular flange, an annular gasket between said flange and the upper surface of the cover, an annular bead formed on the lower part of the ring engaging the under surface of the cover, said ring being tapered internally, a post having a tapered upper part fitting in the tapered ring and having an annular collar bearing against the bead of the ring, and a seal formed at the upper part of the post and the upper part of the ring.

4. In a battery terminal a battery cover having an opening, a ring having a tubular body portion tapered internally, an annular flange having an annular recess on its lower surface, a rubber gasket fitted in said recess and bearing on the top of the cover, and a bead formed on the lower end of the ring bearing against the under surface of the cover.

5. In a battery terminal, as claimed in claim 4, the upper surface of the cover having a recess to engage the lower part of the gasket, a post having an upper tapered part extending upwardly into the ring, a collar on the post having an annular socket to engage the bead, and a seal formed at the upper end of the post and the upper part of the ring.

In testimony whereof I have signed my name to this specification.

W. A. MACKENZIE.